United States Patent

Lagnemo et al.

[11] Patent Number: 5,827,811
[45] Date of Patent: Oct. 27, 1998

[54] BLEACHING AGENT

[75] Inventors: Hans Lagnemo, Nödinge; Monica Jigstam, Torslanda; Cecilia Oddstig, Göteborg., all of Sweden

[73] Assignee: EKA Chemicals AB, Bohus, Sweden

[21] Appl. No.: 809,899

[22] PCT Filed: Aug. 24, 1995

[86] PCT No.: PCT/SE95/00959

§ 371 Date: Mar. 21, 1997

§ 102(e) Date: Mar. 21, 1997

[87] PCT Pub. No.: WO96/11252

PCT Pub. Date: Apr. 18, 1996

[30] Foreign Application Priority Data

| Oct. 7, 1994 | [WO] | WIPO | PCT/SE94/00943 |
| Oct. 7, 1994 | [WO] | WIPO | PCT/SE94/00944 |
| Nov. 3, 1994 | [SE] | Sweden | 9403778 |

[51] Int. Cl.$^6$ .............................. C11D 3/39; C01B 15/10
[52] U.S. Cl. .............................. 510/377; 510/375; 8/111; 252/186.43; 252/186.25; 252/186.27
[58] Field of Search ................ 252/186.25, 186.33, 252/186.43, 77; 510/375, 378, 441; 8/111

[56] References Cited

U.S. PATENT DOCUMENTS

| 3,975,280 | 8/1976 | Hachmann et al. | 252/102 |
| 3,977,988 | 8/1976 | Tokiwa et al. | 252/99 |
| 4,075,116 | 2/1978 | Mesaros | 252/102 |
| 4,231,890 | 11/1980 | Yagi et al. | 252/186 |
| 5,340,496 | 8/1994 | Sato et al. | 252/186.27 |

FOREIGN PATENT DOCUMENTS

| 0459325 | 12/1991 | European Pat. Off. . |
| 0546815 | 6/1993 | European Pat. Off. . |
| 0573731 | 12/1993 | European Pat. Off. . |
| 0634482 | 1/1995 | European Pat. Off. . |
| 58-74508 | 5/1983 | Japan . |
| 659082 | 12/1986 | Switzerland . |
| 1466799 | 3/1977 | United Kingdom . |
| 1538893 | 1/1979 | United Kingdom . |
| 1575792 | 10/1980 | United Kingdom . |
| WO 95/25065 | 9/1995 | WIPO . |

*Primary Examiner*—Margaret Einsmann
*Attorney, Agent, or Firm*—McDermott, Will & Emery

[57] ABSTRACT

The invention relates to particles comprising a peroxy compound with capability of releasing hydrogen peroxide or peroxy acids in aqueous solutions and up to 15% by weight of a dicarboxylic acid having from 5 to 10 carbon atoms or a salt thereof. The invention also relates to use of the particles and a composition comprising such particles.

29 Claims, No Drawings

BLEACHING AGENT

The present invention relates to particles comprising a peroxy compound and a dicarboxylic acid having from 5 to 10 carbon atoms or a salt thereof. The invention also relates to use of the particles and a composition containing such particles.

Powder detergent compositions often contain peroxy compounds as bleaching agents which release hydrogen peroxide or peroxy acids in aqueous solutions. However, many peroxy compounds are not storaae stable. Their decomposition is supposed to be catalysed by metal cations moving comparatively freely through the water normally being present in detergents, but is also facilitated by the alkaline pH (normally from about 8 to about 12) and by other components commonly present in detergents, for example zeolites or bleaching activators such as TAED (tetraacetylethylene diamine), TAGU (tetraacetylglucoluril) or PAG (penta acetyl glucose)

In order to make environmental friendly detergents, it is desirable to use alkali metal carbonate peroxy hydrate, commonly known as percarbonate, as a bleaching agent. However, the activity of percarbonate in a detergent decreases rapidly through decomposition if the detergent is stored at normal room temperature and humidity.

Many attempts to stabilize percarbonate have been done, for example by mixing or coating with stabilizing substances such as sulfates, carbonates, borates, silicates or organic substances. Such stabilizing methods are described in the patent literature, for example in GB 1466799, GB 1538893, GE 1575792, EP 459625, U.S. Pat. No. 3,975,280 and EP 573731.

U.S. Pat. No. 4,075,116 describes preparation of percarbonate from sodium carbonate, hydrogen peroxide and different additives.

CH patent 659082 describes mixing bleaching agents with high amounts of inorganic carbonates and water soluble acids and thereby increasing the dissolution rate.

Japanese laid open patent application (Kokai) Sho 58-74508 describes a mixing percarbonate with silicate and phosphate, borate, citrate, tartrate or succinate of sodium and thereby increasing the dissolution rate.

U.S. Pat. No. 5,340,496 describes stabilization of percarbonate with certain combinations of inorganic salts and carboxylic acids, particularly long chained acids such as oleic acid.

The object of the present invention is to provide particles comprising a peroxy compound, particularly alkali metal percarbonate, with improved storage stability, particularly in detergent compositions. It is another object of the invention to provide particles comprising a peroxy compound only containing environmental friendly constituents.

Through the present invention, these objects has been fulfilled by providing particles comprising a peroxy compound with capability of releasing hydrogen peroxide or peroxy acids in aqueous solutions, the particles further comprising up to 15% by weight, preferably up to about 10% by weight, most preferably up to about 5% by weight of a preferably water soluble dicarboxylic acid having from 5 to 10 carbon atoms or a salt thereof. The particles preferably comprise more than about 0.01% by weight, most preferably more than about 0.05% by weight of such a dicarboxylic acid or a salt thereof. The amount of the peroxy compound in the particles is suitably from about 10 to about 99% by weight, preferably more than 50% by weight and most preferably up to about 95% by weight. The dicarboxylic acid in the particles may be mixed with the peroxy compound and/or be included in a coating.

It is assumed that the dicarboxylic acid acts as a chelating agent, but it has surprisingly been found that the dicarboxylic acids according to the invention gives superior storage stability compared to conventional chelating agents such as EDTA. Too high a concentration of dicarboxylic acids or salts thereof will however decrease the thermal stability, particularly at high concentrations of the peroxy compounds.

It is preferred to use an alkali metal or an alkaline earth metal salt of the dicarboxylic acid. Alkali metals are preferably selected from sodium, potassium or mixtures thereof, and alkaline earth metals are preferably selected from calcium, magnesium or mixtures thereof. Sodium salts are particularly preferred. In the following description of the invention, the term dicarboxylic acid also refers to salts thereof.

Suitably, the dicarboxylic acid comprises from 5 to 8 carbon atoms, preferably 5 to 7 carbon atoms. Preferably, the carboxylic acid groups are located at the ends of the carbon chain. Further, the dicarboxylic acid preferably does not comprise any hydroxyl groups and most preferably it does not comprise any functional groups except the carboxylic acid groups.

The most preferred dicarboxylic acids satisfy the formula:

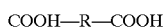

COOH—R—COOH in which R is alkylene, which is preferred, or alkenylene, having from 3 to 8 carbon atoms, preferably from 3 to 5 carbon atoms. Preferably, R is a straight chain without branches.

Examples of useful dicarboxylic acids are glutaric acid adipic acid, pimelic acid, suberic acid, azelaic acid, sebacic acid and mixtures thereof, of which glutaric acid, adipic acid and pimelic acid are particularly preferred. Glutaric acsa is the most preferred acid.

It is to be understood that the particles may include two or more different dicarboxylic acids as described herein.

The particles may also include other environmentally acceptable stabilizers or inert substances.

The particles preferably contain silicate which further improves tne stability and also enhances the mechanical strength. Silicate may be mixed with the peroxy compound and/or be included in a coating. Preferably at least some of the silicate is mixed with the peroxy compound. The silicate is suitably an alkali metal silicate, preferably of sodium, potassium or mixtures thereof, most preferably of sodium. The molar ratio $SiO_2:M_2O$, M being an alkali metal, is preferably from about 1 to about 3, most preferably from about 1 to about 2.5. The particles suitably contains from about 0.1 to about 20% by weight, preferably from about 0.2 to about 15% by weight, most preferably from about 0.5 to about 10% by weight of silicate expressed as sodium silicate.

It has been found that the stability is further improved if the particles contain a water soluble magnesium compound, preferably magnesium sulfate. The magnesium compound may be mixed with the peroxy compound and/or be included in a coating. Preferably at least some of the magnesium is mixed with the peroxy compound, most preferably in combination with alkali metal silicate. The particles preferably contains from about 0.01 to about 50 by weight, most preferably from about 0.1 to about 3% by weight of magnesium compounds expressed as magnesium sulfate.

According to an embodiment of the invention, it has been found that a synergistic effect appears if the particles also comprise a chelating agent selected from hydroxy carboxylic acids satisfying the formula:

$R'C_nH_m(OH)_nCOOH$ in which R' is $CH_2OH$ or COOH, n is 2–6, and m is 0–n; or salts thereof.

It is preferred to use an alkali metal or an alkaline earth metal salt of the hydroxy carboxylic acid. Alkali metals are preferably selected from sodium, potassium or mixtures thereof, and alkaline earth metals are preferably selected from calcium, magnesium or mixtures thereof. Sodium salts are particularly preferred. in the following description of the invention, the term hydroxy carboxylic acid also refers to salts thereof.

The particles preferably contain from about 0.01 to about 15% by weight, most preferably from about 0.01 to about 10% by weight, particularly preferably from about 0.05 to about 5% by weight of hydroxy carboxylic acids of the above formula. The weight ratio dicarboxylic acid to hydroxy carboxylic acid is preferably from about 0.05:1 to about 4:1, most preferably from about 0.1:1 to about 1:1. The hydroxy carboxylic acid may be mixed with the peroxy compound and/or be included in a coating.

Preferably R' in the above formula is $CH_2OH$. It is also preferred that n is 4 or 5. Preferably, m is equal to n or n–2, the carbon chain thus being saturated or containing one double bond. A particularly preferred salt of a hydroxy carboxylic acid is alkali metal glucoheptonate (R' is $CH_2OH$, n and m are 5). Other preferred salts of hydroxy carboxylic acids are alkali metal gluconate (R' is $CH_2OH$, n and m are 4) and alkali metal ascorbate (R' is $CH_2OH$, n is 4 and m is 2). Other useful hydroxy carboxylic acids include, for example, trihydroxy glutaric acid, tartaric acid or saccharic acid. It is to be understood that the particles may include two or more different hydroxy carboxylic acids of the above formula.

Particles according to the invention have high stability even if uncoated, but the highest stability is normally achieved if the particles are coated. Such a coating may for example contain one or more dicarboxylic acid as described herein, hydroxy carboxylic acids as described herein, alkali metal silicate, water soluble magnesium compounds such as magnesium sulfate, alkali metal salts of carbonate, bicarbonate or sulfate, or environmental acceptable organic chelating agents, the different components being applied in one or several layers.

In one embodiment of the invention, a dicarboxylic acid as described herein is only present as mixed with the peroxy compound while a hydroxy carboxylic acid as described herein is only present in a coating, or vice versa.

In another embodiment both a dicarboxylic acid as described herein and a hydroxy carboxylic acid as described herein are mixed with the peroxy compound and/or are included in a coating.

Suitably, the particles have an average diameter From about 50 to about 3000 $\mu$m, preferably from about 100 to about 1600 $\mu$m. The preferred density is from about 600 to about 1500 g/l, particularly from about 800 to about 1100 g/l. It has been found that a high density as well as a high average particle size improves the storage stability.

The invention is particularly advantageous if the peroxy compound is alkali metal percarbonate, but also other peroxy compounds can be stabilized, for example alkali metal salts of perborates, peroxysulfates, peroxyphosphates or peroxysilicates, peroxycarboxylic acids or peroxycarboxylic acid releasing compounds such as di-acylated di-peroxy carboxylic acids (see WO 91/17143).

Particles according to the invention can be prepared by conventional methods. Ingredients to be mixed with the peroxy compound are preferably added in a granulation step, but may also be included directly when, for example, alkali metal percarbonate is produced from alkali metal carbonate and hydrogen peroxide. If alkali metal silicate is to be included, it is preferably added in the form of an aqueous solution, and the dicarboxylic acid or a salt thereof and optionally a hydroxy carboxylic acid or a salt thereof is then preferably mixed therein before addition to the peroxy compound. Granulation may be performed by conventional methods well known among those skilled in the art, such as compacting, extruding, agglomeration in drum or disk, fluid-bed granulation, prilling or in different kinds of mixers. An optional coating step may be performed by spraying the particles with preferably aqueous solutions of the components to be applied, for example in a drum or a fluid bed.

The invention further concerns use of the described particles comprising a peroxy compound and a dicarboxylic acid as a bleaching agent, preferably in connection with washing of textiles or dishwashing. The washing water may be supplied with particles according to the invention being included in a detergent composition or being in the form of a separate bleaching powder. Preferably, washing water is supplied with particles in an amount so to obtain from about 0.001 to about 1 gram active oxygen per liter, which for example corresponds to from about 0.01 to about 6 grams sodium percarbonate.

Finally, the invention concerns a ccmuosition containing an inert filler, and/or one or several substances active at washing, which composition further contains particles comprising a peroxy compound and a dicarboxylic acid according to the invention, for example in an amount from about 1 up to about almost 100% by weight. The composition may comprise a mixture of particles containing different kinds of peroxy compounds. The substances active at washing may include detergent builders, surfactants, alkali generating substances, bleaching activators, enzymes, or any other substances commonly used in detergents. The detergent builder may for example be selected from phosphates such as tripolyphosphates, pyrophosphates or orthophosphates of alkali metals or ammonium, zeolites such as Zeolite A (e.g. Zeolite 4A), Zeolite B, Zeolite P, Zeolite X, or Zeolite HS, Zeolite MAP, silicates such crystalline layered disilicates (e.g. of the formula $NaMSI_{x+1} \cdot yH_2O$ wherein M is sodium or hydrogen, x is a number from 1.9 to 4 and y is a number from 0 to 20), amorphous disilicates (e.g. Britesil™) polycarboxylates, citrates, carbonates, bicarbonates, sesquicarbonates, sulfates, borates or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alpha-sulfonated methyl fatty acid esters, alkylsulfates, alcoholethoxysulfates, alpha-olefine sulfonates, alkali metal sarcosinates or alkyl ester sulfonates. Nonionic surfactants may for example be selected from alkoxylated compounds such as fatty alcohols, alkylphenols and alkylamines or from alkyl polyglucosides or polyhydroxy fatty acid amides. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from N- or O-acylated compounds such as TAED, TAGU, SNOBS (sodium nonoyl benzene sulfonate), PAG (penta acetyl glucose) or diacylated diperoxy carboxylic acids (see WO 91/17143). The feller may include any inert substance such as sodium sulfate. The composition may constitute a complete detergent or a bleaching powder to be added separately at washing. The enzymes may for example be selected from amylases, neutral and alkaline proteases, lipases, esterases or cellulases.

A complete detergent for washing of textiles suitably contains from about 1 to about 40% by weight, preferably from about 10 to about 30% by weight of particles according to the invention. Further, the detergent suitably contains a detergent builder, for example from about 5 to about 50% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5% by weight of soaps. The detergent may also contain bleaching activators, for example from about 1 to about 10% by weight, enzymes, for example from about 0.5 to about 2.5% by weight, and fillers such as sodium sulfate, for example from about 5 to about 50% by weight. It is also possible to include chelating agents such as phosphonates, EDTA, NTA (nitrilo triacetic acid), iminodiacetic acid derivatives or EDDS (ethylenediamine-N,N-disuccinic acid, for example in an amount from about 0.1 to about 1% by weight. Additionally, the detergent may contain conventional components such as water glass, carboxy methyl cellulose, dispersants such as homo or copolymers of polycarboxylic acids, foam regulators, antioxidants, perfumes, colouring agents, optical brighteners and water (normally from about 3 to about 15% by weight). The detergent can be prepared with conventional methods such as dry mixing, agglomeration or spray drying. If the preparation involves spray drying, any heat sensible component such as particles comprising peroxy compounds, enzymes and perfumes should be added to the dried material.

A separate bleaching powder may comprise up to almost 100% by weigh: of particles containing peroxy compounds according to the invention, but preferably the content is from about 5 to about 90% by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated dipercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15%; by weight of a bleaching agent comprising particles according to the invention, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP), from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 80% by weight of alkali metal metasilicate and the builder preferably substantially consisting of STPP.

The present invention makes it possible to prepare stable bleaching agents comprising peroxy compounds, particularly percarbonate, which may be used in detergents including zeolites such as zeolite 4A. The invention also makes it possible to decrease or exclude the use of for example EDTA or phosphonates which are less suitable from an environmental point of view.

The invention will now be described through the following examples which, however, not are intended to limit the scope of the invention. If not otherwise stated, all contents an percentages refer to content and percent by weight based on the entire particle.

EXAMPLE 1

Sodium percarbonate particles with a diameter of about 315–1250 μm and a density of about 900 g/l were prepared by granulating fine percarbonate particles in a rotating Eirich drum together with different additives supplied as aqueous solutions and drying the granules in a fluidized bed. In order to test the storage stability of the percarbonate, the prepared particles as well as reference particles of pure sodium percarbonate were included in a standard detergent IEC-Z (Henkel) consisting of 9.7% linear alkyl benzenesulfonate ($C_{average}$11.5), 5.2% ethoxylated $C_{12-18}$alcohol ($EO_7$), 3.6% sodium-soap, 32.5% zeolite 4A, 11.8% sodium carbonate, 5.2% sodium salt of copolymerisate of acrylic- and maleic acid (Sokolan $CP_5$), 3.4% sodium waterglass (ratio 3.3), 1.3% carboxy methyl cellulose, 0.3% EDTA, 0.3% optical brightener (stilbene type), 7.4% sodium sulfate, 12.2% water, 6.5% foam inhibitor (SIK), 0.5% enzyme prills protease (activity 300.00). Samples were prepared from 64 grams IEC-Z, 12 grams percarbonate particles and 4 grams TAED. A Quick Stability Index (QSI) was determined for each sample by measuring the amount of oxygen formed during 24 hours storage at 40° C. and dividing the amount oxygen liberated by the relative content (%) of active oxygen in the original percarbonate. Thus, a low QSI-value means high stability. The results appear in the table below, in which the contents of the different constituents refer to % by weight based on the entire particle. The following abbreviations are used: SPC=sodium percarbonate; GA=sodium salt of glutaric acid; GH=sodium glucoheptonate; AA=sodium salt of adipic acid; PA=sodium salt of pimelic acid; SDS=sodium disilicate; AO=active oxygen; QSI= cuick stability index.

| SPC | GA | AA | PA | AO | QSI |
|---|---|---|---|---|---|
| 100% | — | — | — | 14.5% | 5.66 |
| 98% | 2% | — | — | 14.1% | 2.64 |
| 98% | — | -2% | — | 14.3 | 2.09 |
| 98% | — | — | 2% | 14.1% | 2.38 |

EXAMPLE 2

Sodium percarbonate were prepared and tested as in Example 1. The results appear in the table below:

| SPC | GA | GH | SDS | MgSO₄ | AO | QSI |
|---|---|---|---|---|---|---|
| 97.2% | 1.5% | — | 1.2% | 0.1% | 14.0% | 2.28 |
| 97.2% | — | 1.5% | 1.2% | 0.1% | 14.0% | 2.59 |
| 97.2% | 0.5% | 1.0% | 1.2% | 0.1% | 14.1% | 1.63 |
| 97.2% | 1.0% | 0.5% | 1.2% | 0.1% | 14.1% | 2.14 |

EXAMPLE 3

Sodium percarbonate particles with a diameter of about 315–1250 μm and a density of about 900 g/l were prepared by granulation from fine percarbonate particles together with sodium salt of glutaric acid, sodium disilicate and magnesium sulfate supplied as aqueous solutions. The granulation was performed by extruding a mixture of the ingredients, crushing the string formed, rounding the particles obtained on a rotating disk and drying and sieving the rounded particles. For comparative purposes one sample was prepared without glutaric acid and one sample was prepared with EDTA instead of glutaric acid. The stability of the particles was tested in a standard IEC-Z detergent in the same way as in Example 1 and the results appear in the table below.

| SPC | GA | EDTA | SDS | MgSO₄ | AO | QSI |
|---|---|---|---|---|---|---|
| 99.2% | — | — | 0.67% | 0.12% | 14.3% | 3.4 |
| 99.0% | — | 0.2% | 0.67% | 0.12% | 14.4% | 3.1 |
| 99.0% | 0.2% | — | 0.67% | 0.12% | 14.4% | 2.6 |
| 98.8% | 0.5% | — | 0.63% | 0.12% | 14.2% | 2.1 |

EXAMPLE 4

Sodium percarbonate particles with a diameter of 315–1250 μm were coated with sodium salts of glutaric acid and/or glucoheptonic acid applied as aqueous solutions by spraying in a fluidized bed. For comparative purposes particles were also coated with benzoic acid and caproic acid. The stability of the particles was tested in a standard IEC-Z detergent in the same way as in Example 1 and the results appear in the table below.

| SPC | GA | GH | AO | QSI |
|---|---|---|---|---|
| 100% | — | — | 14.5% | 5.66 |
| 95% | 5% | — | 13.6% | 0.65 |
| 95% | — | 5% | 13.9% | 0.78 |
| 95% | 4% | 1% | 13.6% | 0.40 |
| 95% | 3% | 2% | 13.4% | 0.31 |
| 95% | 2% | 3% | 13.3% | 0.25 |
| 95% | 1% | 4% | 13.6% | 0.31 |
| 95% | 5% benzoic acid | | 13.8% | 2.31 |
| 95% | 5% caproic acid | | 13.9% | 2.27 |

EXAMPLE 5

Sodium percarbonate particles with a diameter of 315–1250 μm were coated by spraying in a fluidized bed with a first aqueous solution of sodium silicate ($SiO_2$:$Na_2O$ ratio 1), sodium glucoheptonate and/or sodium salt of glutaric acid, and a second solution of magnesium sulfate and optionally sodium sulfate or sodium bicarbonate. In one experiment a third solution of sodium carbonate was applied. The stability of the particles was tested in a IEC-Z detergent in the same way as in Example 1 and the results appear in the table below:

| | Exp. 1 | Exp. 2 | Exp. 3 | Exp. 4 |
|---|---|---|---|---|
| sodium percarbonate | 85.1% | 85.1% | 85.1% | 85.1% |
| glucoheptonic acid | — | 0.75% | 0.75% | 0.75% |
| glutaric acid | 1.5% | 0.75% | 0.75% | 0.75% |
| sodium disilicate | 2% | 2% | 2% | 2% |
| MgSO₄ | 1.4% | 1.4% | 1.4% | 1.4% |
| Na₂SO₄ | 10% | 10% | — | — |
| NaHCO₃ | — | — | 10% | — |
| Na₂CO₃ | — | — | — | 10% |
| active oxygen | 12.8% | 12.9% | 12.8% | 12.8% |
| QSI | 0.28 | 0.22 | 0 | 0.16 |

EXAMPLE 6

Sodium percarbonate parzicles prepared by granulation as in Example 3 contained 98.8% sodium percarbonate, 0.12% MgSO₄, 0.63% sodium disilicate, 0.5% gluzaric acid (as sodium salt), and had a content of active oxygen of 14.2%. The particles were coated as in Examples 5 with 1.4% MgSO₄, 2% sodium disilicate, 10% Na₂CO₃, and 1% glutaric acid (as sodium salt). The coated particles contained 12.6% of active oxygen. The stability of the particles was tested in a IEC-Z detergent in the same way as in Example 1 and it was found that QSI for the uncoated particles was 2.20 and QSI for the coated particles was 0.04.

We claim:

1. Particles comprising a peroxy compound with capability of releasing hydrogen peroxide or peroxy acids in aqueous solutions, wherein the particles comprise from about 0.01 to 15% by weight of a dicarboxylic acid having from 5 to 10 carbon atoms or a salt thereof.

2. Particles as claimed in claim 1, comprising up to about 10% by weight of a dicarboxylic acid having from 5 to 10 carbon atoms or a salt thereof.

3. Particles as claimed in claim 1, wherein the particles comprise an alkali metal or alkaline earth metal salt of a dicarboxylic acid having from 5 to 10 carbon atoms.

4. Particles as claimed in claim 1, wherein a dicarboxylic acid having from 5 to 10 carbon atoms or a salt thereof is mixed with the peroxy compound.

5. Particles as claimed in claim 4, wherein the peroxy compound and the dicarboxylic acid are granulated together.

6. Particles as claimed in claim 1, wherein a dicarboxylic acid having 5 to 10 carbon atoms or a salt thereof is included in a coating.

7. Particles as claimed in claim 1 wherein the dicarboxylic acid satisfies the formula:

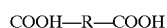

COOH—R—COOH in which R is alkylene or alkenylene having from 3 to 8 carbon atoms.

8. Particles as claimed in claim 7, wherein R is a straight chain without branches.

9. Particles as claimed in claim 8, wherein the dicarboxylic acid is selected from the group consisting of glutaric acid, adipic acid, pimelic acid, suberic acid, azelaic acid, sebacic acid and mixtures thereof.

10. Particles as claimed in claim 9, wherein the dicarboxylic acid is glutaric acid.

11. Particles as claimed in claim 1, wherein the particles further comprise silicate.

12. Particles as claimed in claim 11, wherein the particles further comprise alkali metal silicate.

13. Particles as claimed in claim 11, wherein the silicate is mixed with the peroxy compound.

14. Particles as claimed in claim 11, wherein the silicate is included in a coating.

15. Particles as claimed in claim 1, wherein the particles further comprise a water soluble magnesium compound.

16. Particles as claimed in claim 1, wherein the particles further comprise a hydroxycarboxylic acid having the formula:

$$R'\ C_nH_m(OH)_nCOOH$$

in which R' is $CH_2OH$ or COOH, n is 2–6, and m is 0–n; or salts thereof.

17. Particles as claimed in claim 16, wherein R' is $CH_2OH$, n is 4 or 5, and m is equal to n or n−2.

18. Particles as claimed in claim 17, wherein the hydroxy carboxylic acid is glucoheptonic acid.

19. Particles as claimed in claim 16, wherein a hydroxy carboxylic acid or a salt is mixed with the peroxy compound.

20. Particles as claimed in claim 16, wherein the hydroxy carboxylic acid or a salt is included in a coating.

21. Particles as claimed in claim 16, wherein a dicarboxylic acid having from 5 to 10 carbon atoms and a hydroxy carboxylic acid are both mixed with the peroxy compound.

22. Particles as claimed in claim 16, wherein a dicarboxylic acid having from 5 to 10 carbon atoms and a hydroxy carboxylic acid are both included in a coating.

23. Particles as claimed in claim 1, wherein the peroxy compound is alkali metal percarbonate.

24. Particles as claimed in claim 1, wherein the bulk density is from about 800 to about 1500 g/l.

25. Particles as claimed in claim 24, wherein the bulk density is from about 800 to about 1100 g/l.

26. A method for bleaching an article, comprising washing the article with a detergent containing particles as claimed in claim 1.

27. A composition comprising at least one of an inert filler, or one or several substances active at washing, which composition further contains particles according to claim 1.

28. A detergent composition comprising particles according to claim 1.

29. A detergent composition as claimed in claim 28, wherein it comprises zeolite as a builder.

* * * * *